US008347309B2

(12) United States Patent
Smolens et al.

(10) Patent No.: US 8,347,309 B2
(45) Date of Patent: Jan. 1, 2013

(54) DYNAMIC MITIGATION OF THREAD HOGS ON A THREADED PROCESSOR

(75) Inventors: Jared C. Smolens, San Jose, CA (US); Robert T. Golla, Round Rock, TX (US); Matthew B. Smittle, Allen, TX (US)

(73) Assignee: Oracle America, Inc., Redwood City, CA (US)

( * ) Notice: Subject to any disclaimer, the term of this patent is extended or adjusted under 35 U.S.C. 154(b) by 703 days.

(21) Appl. No.: 12/511,620

(22) Filed: Jul. 29, 2009

(65) Prior Publication Data
US 2011/0029978 A1 Feb. 3, 2011

(51) Int. Cl.
G06F 9/46 (2006.01)
G06F 9/30 (2006.01)
(52) U.S. Cl. ........ 718/108; 718/102; 718/103; 718/104; 712/214
(58) Field of Classification Search .................. None
See application file for complete search history.

(56) References Cited

U.S. PATENT DOCUMENTS

| | | | |
|---|---|---|---|
| 6,154,849 A | | 11/2000 | Xia |
| 6,334,177 B1 | | 12/2001 | Baumgartner et al. |
| 6,535,905 B1 | * | 3/2003 | Kalafatis et al. ............... 718/108 |
| 6,785,803 B1 | * | 8/2004 | Merchant et al. ............. 712/219 |
| 6,898,687 B2 | | 5/2005 | Wu et al. |
| 7,000,047 B2 | * | 2/2006 | Nguyen et al. ................ 710/200 |
| 7,330,988 B2 | * | 2/2008 | Golla et al. ................... 713/322 |
| 2005/0044319 A1 | * | 2/2005 | Olukotun ...................... 711/118 |
| 2007/0118726 A1 | * | 5/2007 | Abernathy et al. ........... 712/225 |
| 2007/0282928 A1 | * | 12/2007 | Jiao et al. ...................... 707/204 |
| 2008/0250233 A1 | * | 10/2008 | Marden et al. ................ 712/228 |

* cited by examiner

Primary Examiner — Meng An
Assistant Examiner — Tammy Lee
(74) Attorney, Agent, or Firm — Rory D. Rankin; Meyertons, Hood, Kivlin, Kowert & Goetzel, P.C.

(57) ABSTRACT

Systems and methods for efficient thread arbitration in a processor. A processor comprises a multi-threaded resource. The resource may include an array of entries which may be allocated by threads. A thread arbitration table corresponding to a given thread stores a high and a low threshold value in each table entry. A thread history shift register (HSR) indexes the table, wherein each bit of the HSR indicates whether the given thread is a thread hog. When the given thread has more allocated entries in the array than the high threshold of the table entry, the given thread is stalled from further allocating array entries. Similarly, when the given thread has fewer allocated entries in the array than the low threshold of the selected table entry, the given thread is permitted to allocate entries. In this manner, threads that hog dynamic resources can be mitigated such that more resources are available to other threads that are not thread hogs. This can result in a significant increase in overall processor performance.

18 Claims, 8 Drawing Sheets

Thread Arbitration Table 600

| Thread History[3:0] | High Threshold (HT) | Low Threshold (LT) |
|---|---|---|
| 0000 | 16 | 8 |
| 0001 | 16 | 8 |
| 0010 | 16 | 8 |
| 0011 | 12 | 6 |
| 0100 | 16 | 8 |
| 0101 | 12 | 6 |
| 0110 | 12 | 6 |
| 0111 | 8 | 4 |
| 1000 | 16 | 8 |
| 1001 | 12 | 6 |
| 1010 | 12 | 6 |
| 1011 | 8 | 4 |
| 1100 | 12 | 6 |
| 1101 | 8 | 4 |
| 1110 | 8 | 4 |
| 1111 | 4 | 0 |

FIG. 4A

Thread Arbitration Table 650

| Thread History [3:0] | Active Threads (AT) | High Threshold (HT) | Low Threshold (LT) | Active Threads (AT) | High Threshold (HT) | Low Threshold (LT) | Active Threads (AT) | High Threshold (HT) | Low Threshold (LT) |
|---|---|---|---|---|---|---|---|---|---|
| 0000 | 5 to 8 | 16 | 8 | 4 | 32 | 24 | 2 to 3 | 32 | 24 |
| 0001 | 5 to 8 | 16 | 8 | 4 | 24 | 16 | 2 to 3 | 32 | 24 |
| 0010 | 5 to 8 | 16 | 8 | 4 | 24 | 16 | 2 to 3 | 32 | 24 |
| 0011 | 5 to 8 | 12 | 6 | 4 | 16 | 8 | 2 to 3 | 24 | 16 |
| 0100 | 5 to 8 | 16 | 8 | 4 | 24 | 16 | 2 to 3 | 32 | 24 |
| 0101 | 5 to 8 | 12 | 6 | 4 | 16 | 8 | 2 to 3 | 24 | 16 |
| 0110 | 5 to 8 | 12 | 6 | 4 | 16 | 8 | 2 to 3 | 24 | 16 |
| 0111 | 5 to 8 | 8 | 4 | 4 | 8 | 4 | 2 to 3 | 16 | 8 |
| 1000 | 5 to 8 | 16 | 8 | 4 | 24 | 16 | 2 to 3 | 32 | 24 |
| 1001 | 5 to 8 | 12 | 6 | 4 | 16 | 8 | 2 to 3 | 24 | 16 |
| 1010 | 5 to 8 | 12 | 6 | 4 | 16 | 8 | 2 to 3 | 24 | 16 |
| 1011 | 5 to 8 | 8 | 4 | 4 | 8 | 4 | 2 to 3 | 16 | 8 |
| 1100 | 5 to 8 | 12 | 6 | 4 | 16 | 8 | 2 to 3 | 24 | 16 |
| 1101 | 5 to 8 | 8 | 4 | 4 | 8 | 4 | 2 to 3 | 16 | 8 |
| 1110 | 5 to 8 | 8 | 4 | 4 | 8 | 4 | 2 to 3 | 16 | 8 |
| 1111 | 5 to 8 | 2 | 0 | 4 | 2 | 0 | 2 to 3 | 2 | 0 |

*FIG. 4B*

DYNAMIC MITIGATION OF THREAD HOGS ON A THREADED PROCESSOR

BACKGROUND OF THE INVENTION

1. Field of the Invention

This invention relates to computing systems, and more particularly, to thread arbitration in a processor.

2. Description of the Relevant Art

The performance of computer systems is dependent on both hardware and software. In order to increase the throughput of computing systems, the parallelization of tasks is utilized as much as possible. To this end, compilers may extract parallelized tasks from program code and many modern processor core designs have deep pipelines configured to perform multi-threading.

In software-level multi-threading, an application program uses a process, or a software thread, to stream instructions to a processor for execution. A multi-threaded software application generates multiple software processes within the same application. A multi-threaded operating system manages the dispatch of these and other processes to a processor core. In hardware-level multi-threading, a multi-threaded processor core executes hardware instructions from different software processes at the same time. In contrast, single-threaded processors operate on a single thread at a time.

Often times, threads and/or processes share resources. Examples of resources that may be shared between threads include queues utilized in a fetch pipe stage, a load and store memory pipe stage, rename and issue pipe stages, a completion pipe stage, branch prediction schemes, and memory management control. These resources are generally shared between all active threads. For a particular pipe stage, each thread may utilize a separate queue. In some cases, resource allocation may be relatively inefficient. For example, one thread may not fully utilize its resources or may be inactive. Meanwhile, a second thread may fill its queue and its performance may decrease as younger instructions are forced to wait.

For a multi-threaded processor, dynamic resource allocation between threads may result in the best overall throughput performance on commercial workloads. In general, resources may be dynamically allocated within a resource structure such as a queue for storing instructions of multiple threads within a particular pipe stage. Therefore, the resources may be allocated based on the workload needs of each thread.

The amount of parallelism present in a microarchitecture places pressure on shared resources within a processor core. For example, as many as 8 threads may each simultaneously request an integer arithmetic functional unit. Also, these same 8 threads may be waiting to be allocated in entries of a storage queue within a pick unit prior to being issued to execution units. Such situations may lead to hazards that necessitate arbitration schemes for sharing resources, such as a round-robin or least-recently-used scheme.

Over time, shared resources can become biased to a particular thread, especially with respect to long latency operations such as loads that miss the L1 data cache. Other conditions that cause an instruction to not be available for execution may include interlocks, register dependencies, and retirement. A thread hog results when a thread accumulates a disproportionate share of a shared resource and the thread is slow to deallocate the resource. For certain workloads, thread hogs can cause dramatic throughput losses for not only the thread hog, but also for all other threads sharing the same resource.

In view of the above, efficient methods and mechanisms for thread arbitration in a threaded processor with dynamic resource allocation are desired.

SUMMARY OF THE INVENTION

Systems and methods for efficient thread arbitration in a processor are contemplated. In one embodiment, a processor comprises a resource that may be shared by multiple threads, such as a pick queue for out-of-order instruction selection. The pick queue includes an array comprising a plurality of entries, each of which may be allocated for use by any thread. A thread arbitration table corresponding to a given thread stores a high threshold value and a low threshold value in each entry of the table. A thread history shift register (HSR) indexes the table, wherein each bit of the HSR indicates whether the given thread is a thread hog after a predetermined time has elapsed. When the given thread has more allocated entries in the array than a value stored in the high threshold field of the selected table entry, the given thread is stalled from further allocating array entries. Similarly, when the given thread has fewer allocated entries in the array than a value stored in the low threshold field of the selected table entry, the given thread is released from being stalled and may again allocate entries.

These and other embodiments will become apparent upon reference to the following description and accompanying drawings.

BRIEF DESCRIPTION OF THE DRAWINGS

FIG. 4A illustrates another embodiment of a thread arbitration table.

FIG. 4B illustrates another embodiment of a thread arbitration table.

Figure 1:
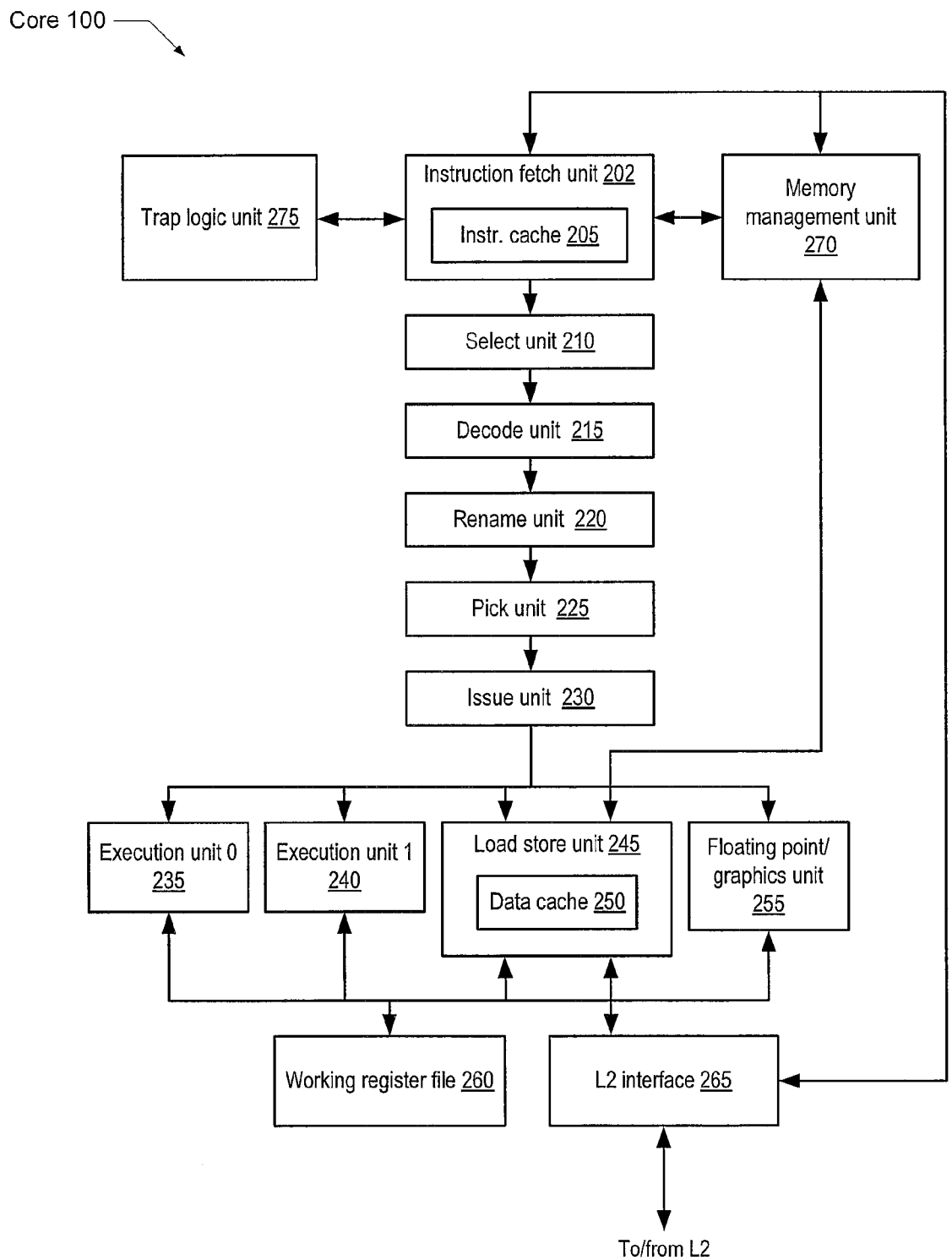
FIG. 1 is a generalized block diagram illustrating one embodiment of a processor core configured to perform dynamic multithreading.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

In the following description, numerous specific details are set forth to provide a thorough understanding of the present invention. However, one having ordinary skill in the art should recognize that the invention may be practiced without these specific details. In some instances, well-known circuits, structures, signals, computer program instruction, and techniques have not been shown in detail to avoid obscuring the present invention.

Referring to FIG. 1, one embodiment of a processor core 100 configured to perform dynamic multithreading is shown. Processor core, or core, 100 processor core 102 may utilize conventional processor design techniques such as complex branch prediction schemes, out-of-order execution, and register renaming techniques. Core 100 may include circuitry for executing instructions according to a predefined instruction set. For example, the SPARC® instruction set architecture (ISA) may be selected. Alternatively, the x86, x86-64®, Alpha®, PowerPC®, MIPS®, PA-RISC®, or any other instruction set architecture may be selected. Generally, processor core 100 may access a cache memory subsystem for data and instructions. Core 100 may contain its own level 1 (L1) and level 2 (L2) caches in order to reduce memory latency. Alternatively, these cache memories may be coupled to processor cores 100 in a backside cache configuration or an inline configuration, as desired.

In one embodiment, processor core 100 may support execution of multiple threads. Multiple instantiations of a same processor core 100 that is able to concurrently execute multiple threads may provide high throughput execution of server applications while maintaining power and area savings. A given thread may include a set of instructions that may execute independently of instructions from another thread. For example, an individual software process may consist of one or more threads that may be scheduled for execution by an operating system. Such a core 100 may also be referred to as a multithreaded (MT) core. In one embodiment, core 100 may be configured to concurrently execute instructions from a variable number of threads, such as up to eight concurrently executing threads.

In one embodiment, core 100 may be configured for multithreaded, out-of-order execution. More specifically, in one embodiment, core 100 may be configured to perform dynamic multithreading. Generally speaking, under dynamic multithreading, the execution resources of core 100 may be configured to efficiently process varying types of computational workloads that exhibit different performance characteristics and resource requirements. Such workloads may vary across a continuum that emphasizes different combinations of individual-thread and multiple-thread performance.

At one end of the continuum, a computational workload may include a number of independent tasks, where completing the aggregate set of tasks within certain performance criteria (e.g., an overall number of tasks per second) is a more significant factor in system performance than the rate at which any particular task is completed. For example, in certain types of server or transaction processing environments, there may be a high volume of individual client or customer requests (such as web page requests or file system accesses). In this context, individual requests may not be particularly sensitive to processor performance. For example, requests may be input/output (I/O)-bound rather than processor-bound-completion of an individual request may need I/O accesses (e.g., to relatively slow memory, network, or storage devices) that dominate the overall time needed to complete the request, relative to the processor effort involved. Thus, a processor that is capable of concurrently processing many such tasks (e.g., as independently executing threads) may exhibit better performance on such a workload than a processor that emphasizes the performance of only one or a small number of concurrent tasks.

At the other end of the continuum, a computational workload may include individual tasks whose performance is highly processor-sensitive. For example, a task that involves significant mathematical analysis and/or transformation (e.g., cryptography, graphics processing, scientific computing) may be more processor-bound than I/O-bound. Such tasks may benefit from processors that emphasize single-task performance, for example through speculative execution and exploitation of instruction-level parallelism.

Dynamic multithreading represents an attempt to dynamically allocate processor resources in a manner that flexibly adapts to workloads that vary along the continuum described above. In one embodiment, core 100 may be configured to implement fine-grained multithreading, in which core 100 may select instructions to execute from among a pool of instructions corresponding to multiple threads, such that instructions from different threads may be scheduled to execute adjacently. For example, in a pipelined embodiment of core 100 employing fine-grained multithreading, instructions from different threads may occupy adjacent pipeline stages, such that instructions from several threads may be in various stages of execution during a given core processing cycle. Through the use of fine-grained multithreading, core 100 may be configured to efficiently process workloads that depend more on concurrent thread processing than individual thread performance.

In one embodiment, core 100 may also be configured to implement out-of-order processing, speculative execution, register renaming and/or other features that improve the performance of processor-dependent workloads. Moreover, core 100 may be configured to dynamically allocate a variety of hardware resources among the threads that are actively executing at a given time, such that if fewer threads are executing, each individual thread may be able to take advantage of a greater share of the available hardware resources. This may result in increased individual thread performance when fewer threads are executing, while retaining the flexibility to support workloads that exhibit a greater number of threads that are less processor-dependent in their performance. In various embodiments, the resources of core 100 that may be dynamically allocated among a varying number of threads may include branch resources (e.g., branch predictor structures), load/store resources (e.g., load/store buffers and queues), instruction completion resources (e.g., reorder buffer structures and commit logic), instruction issue resources (e.g., instruction selection and scheduling structures), register rename resources (e.g., register mapping tables), and/or memory management unit resources (e.g., translation lookaside buffers, page walk resources).

In the illustrated embodiment, core 100 includes an instruction fetch unit (IFU) 202 that includes an L1 instruction cache 205. IFU 202 is coupled to a memory management unit (MMU) 270, L2 interface 265, and trap logic unit (TLU) 275. IFU 202 is additionally coupled to an instruction processing pipeline that begins with a select unit 210 and proceeds in turn through a decode unit 215, a rename unit 220, a pick unit 225, and an issue unit 230. Issue unit 230 is coupled to issue instructions to any of a number of instruction execution resources: an execution unit 0 (EXU0) 235, an execution unit 1 (EXU1) 240, a load store unit (LSU) 245 that includes a L1 data cache 250, and/or a floating point/graphics unit (FGU) 255. These instruction execution resources are coupled to a working register file 260. Additionally, LSU 245 is coupled to L2 interface 265 and MMU 270.

In the following discussion, exemplary embodiments of each of the structures of the illustrated embodiment of core 100 are described. However, it is noted that the illustrated partitioning of resources is merely one example of how core 102 may be implemented. Alternative configurations and variations are possible and contemplated.

Instruction fetch unit (IFU) 202 may be configured to provide instructions to the rest of core 100 for execution. In one embodiment, IFU 202 may be configured to select a thread to be fetched, fetch instructions from instruction cache 205 for the selected thread and buffer them for downstream processing, request data from L2 cache 105 in response to instruction cache misses, and predict the direction and target of control transfer instructions (e.g., branches). In some embodiments, IFU 202 may include a number of data structures in addition to instruction cache 205, such as an instruction translation lookaside buffer (ITLB), instruction buffers, and/or structures configured to store state that is relevant to thread selection and processing.

In one embodiment, virtual to physical address translation may occur by mapping a virtual page number to a particular physical page number, leaving the page offset unmodified. Such translation mappings may be stored in an ITLB or a DTLB for rapid translation of virtual addresses during lookup of instruction cache 205 or data cache 250. In the event no translation for a given virtual page number is found in the appropriate TLB, memory management unit 270 may be configured to provide a translation. In one embodiment, MMU 270 may be configured to manage one or more translation tables stored in system memory and to traverse such tables (which in some embodiments may be hierarchically organized) in response to a request for an address translation, such as from an ITLB or DTLB miss. (Such a traversal may also be referred to as a page table walk or a hardware table walk.) In some embodiments, if MMU 270 is unable to derive a valid address translation, for example if one of the memory pages including a necessary page table is not resident in physical memory (i.e., a page miss), MMU 270 may be configured to generate a trap to allow a memory management software routine to handle the translation.

During the course of operation of some embodiments of core 100, exceptional events may occur. For example, an instruction from a given thread that is selected for execution by select unit 210 may not be a valid instruction for the ISA implemented by core 100 (e.g., the instruction may have an illegal opcode), a floating-point instruction may produce a result that needs further processing in software, MMU 270 may not be able to complete a page table walk due to a page miss, a hardware error (such as uncorrectable data corruption in a cache or register file) may be detected, or any of numerous other possible architecturally-defined or implementation-specific exceptional events may occur.

In one embodiment, trap logic unit 275 may be configured to manage the handling of such events. For example, TLU 275 may be configured to receive notification of an exceptional event occurring during execution of a particular thread, and to cause execution control of that thread to vector to a supervisor-mode software handler (i.e., a trap handler) corresponding to the detected event. Such handlers may include, for example, an illegal opcode trap handler configured to return an error status indication to an application associated with the trapping thread and possibly terminate the application, a floating-point trap handler configured to fix up an inexact result, etc. In one embodiment, TLU 275 may be configured to flush all instructions from the trapping thread from any stage of processing within core 100, without disrupting the execution of other, non-trapping threads.

In the illustrated embodiment, L2 interface 265 may be configured to provide a centralized interface to the L2 cache associated with a particular core 102, on behalf of the various functional units that may generate L2 accesses. In one embodiment, L2 interface 265 may be configured to maintain queues of pending L2 requests and to arbitrate among pending requests to determine which request or requests may be conveyed to L2 cache during a given execution cycle.

In one embodiment, during each execution cycle of core 100, IFU 202 may be configured to select one thread that will enter the IFU processing pipeline. Thread selection may take into account a variety of factors and conditions, some thread-specific and others IFU-specific. For example, certain instruction cache activities (e.g., cache fill), i-TLB activities, or diagnostic activities may inhibit thread selection if these activities are occurring during a given execution cycle. Additionally, individual threads may be in specific states of readiness that affect their eligibility for selection. For example, a thread for which there is an outstanding instruction cache miss may not be eligible for selection until the miss is resolved.

In some embodiments, those threads that are eligible to participate in thread selection may be divided into groups by priority, for example depending on the state of the thread or of the ability of the IFU pipeline to process the thread. In such embodiments, multiple levels of arbitration may be employed to perform thread selection: selection occurs first by group priority, and then within the selected group according to a suitable arbitration algorithm (e.g., a least-recently-fetched algorithm). However, it is noted that any suitable scheme for thread selection may be employed, including arbitration schemes that are more complex or simpler than those mentioned here.

Once a thread has been selected for fetching by IFU 202, instructions may actually be fetched for the selected thread. To perform the fetch, in one embodiment, IFU 202 may be configured to generate a fetch address to be supplied to instruction cache 205. In various embodiments, the fetch address may be generated as a function of a program counter associated with the selected thread, a predicted branch target address, or an address supplied in some other manner (e.g., through a test or diagnostic mode). The generated fetch address may then be applied to instruction cache 205 to determine whether there is a cache hit.

In some embodiments, accessing instruction cache 205 may include performing fetch address translation (e.g., in the case of a physically indexed and/or tagged cache), accessing a cache tag array, and comparing a retrieved cache tag to a requested tag to determine cache hit status. If there is a cache hit, IFU 202 may store the retrieved instructions within buffers for use by later stages of the instruction pipeline. If there is a cache miss, IFU 202 may coordinate retrieval of the missing cache data from L2 cache 105. In some embodiments, IFU 202 may also be configured to prefetch instructions into instruction cache 205 before the instructions are actually requested to be fetched.

In many ISAs, instruction execution proceeds sequentially according to instruction addresses (e.g., as reflected by one or more program counters). However, control transfer instructions (CTIs) such as branches, call/return instructions, or other types of instructions may cause the transfer of execution from a current fetch address to a nonsequential address. As mentioned above, IFU 202 may be configured to predict the direction and target of CTIs (or, in some embodiments, a subset of the CTIs that are defined for an ISA) in order to reduce the delays incurred by waiting until the effect of a CTI is known with certainty.

Through the operations discussed above, IFU 202 may be configured to fetch and maintain a buffered pool of instructions from one or multiple threads, to be fed into the remainder of the instruction pipeline for execution. Generally speaking, select unit 210 may be configured to select and schedule threads for execution. In one embodiment, during any given execution cycle of core 102, select unit 210 may be configured to select up to one ready thread out of the maximum number of threads concurrently supported by core 102 (e.g., 8 threads), and may select up to two instructions from the selected thread for decoding by decode unit 215, although in other embodiments, a differing number of threads and instructions may be selected. In various embodiments, different conditions may affect whether a thread is ready for selection by select unit 210, such as branch mispredictions, unavailable instructions, or other conditions. To ensure fairness in thread selection, some embodiments of select unit 210 may employ arbitration among ready threads (e.g. a least-recently-used algorithm).

The particular instructions that are selected for decode by select unit 210 may be subject to the decode restrictions of decode unit 215; thus, in any given cycle, fewer than the maximum possible number of instructions may be selected. Additionally, in some embodiments, select unit 210 may be configured to allocate certain execution resources of core 102 to the selected instructions, so that the allocated resources will not be used for the benefit of another instruction until they are released. For example, select unit 210 may allocate resource tags for entries of a reorder buffer, load/store buffers, or other downstream resources that may be utilized during instruction execution.

Generally, decode unit 215 may be configured to prepare the instructions selected by select unit 210 for further processing. Decode unit 215 may be configured to identify the particular nature of an instruction (e.g., as specified by its opcode) and to determine the source and sink (i.e., destination) registers encoded in an instruction, if any. In some embodiments, decode unit 215 may be configured to detect certain dependencies among instructions, to remap architectural registers to a flat register space, and/or to convert certain complex instructions to two or more simpler instructions for execution. Additionally, in some embodiments, decode unit 215 may be configured to assign instructions to slots for subsequent scheduling. In one embodiment, two slots 0-1 may be defined, where slot 0 includes instructions executable in load/store unit 245 or execution units 235-240, and where slot 1 includes instructions executable in execution units 235-240, floating point/graphics unit 255, and any branch instructions. However, in other embodiments, other numbers of slots and types of slot assignments may be employed, or slots may be omitted entirely.

Register renaming may facilitate the elimination of certain dependencies between instructions (e.g., write-after-read or "false" dependencies), which may in turn prevent unnecessary serialization of instruction execution. In one embodiment, rename unit 220 may be configured to rename the logical (i.e., architected) destination registers specified by instructions by mapping them to a physical register space, resolving false dependencies in the process. In some embodiments, rename unit 220 may maintain mapping tables that reflect the relationship between logical registers and the physical registers to which they are mapped.

Once decoded and renamed, instructions may be ready to be scheduled for execution. In the illustrated embodiment, pick unit 225 may be configured to pick instructions that are ready for execution and send the picked instructions to issue unit 230. In one embodiment, pick unit 225 may be configured to maintain a pick queue that stores a number of decoded and renamed instructions as well as information about the relative age and status of the stored instructions. During each execution cycle, this embodiment of pick unit 225 may pick up to one instruction per slot. For example, taking instruction dependency and age information into account, for a given slot, pick unit 225 may be configured to pick the oldest instruction for the given slot that is ready to execute.

In some embodiments, pick unit 225 may be configured to support load/store speculation by retaining speculative load/store instructions (and, in some instances, their dependent instructions) after they have been picked. This may facilitate replaying of instructions in the event of load/store misspeculation. Additionally, in some embodiments, pick unit 225 may be configured to deliberately insert "holes" into the pipeline through the use of stalls, e.g., in order to manage downstream pipeline hazards such as synchronization of certain load/store or long-latency FGU instructions.

Issue unit 230 may be configured to provide instruction sources and data to the various execution units for picked instructions. In one embodiment, issue unit 230 may be configured to read source operands from the appropriate source, which may vary depending upon the state of the pipeline. For example, if a source operand depends on a prior instruction that is still in the execution pipeline, the operand may be bypassed directly from the appropriate execution unit result bus. Results may also be sourced from register files representing architectural (i.e., user-visible) as well as non-architectural state. In the illustrated embodiment, core 102 includes a working register file 260 that may be configured to store instruction results (e.g., integer results, floating point results, and/or condition code results) that have not yet been committed to architectural state, and which may serve as the source for certain operands. The various execution units may also maintain architectural integer, floating-point, and condition code state from which operands may be sourced.

Instructions issued from issue unit 230 may proceed to one or more of the illustrated execution units for execution. In one embodiment, each of EXU0 235 and EXU1 240 may be similarly or identically configured to execute certain integer-type instructions defined in the implemented ISA, such as arithmetic, logical, and shift instructions. In the illustrated embodiment, EXU0 235 may be configured to execute integer instructions issued from slot 0, and may also perform address calculation and for load/store instructions executed by LSU 245. EXU1 240 may be configured to execute integer instructions issued from slot 1, as well as branch instructions. In one embodiment, FGU instructions and multi-cycle integer instructions may be processed as slot 1 instructions that pass through the EXU1 240 pipeline, although some of these instructions may actually execute in other functional units.

In some embodiments, architectural and non-architectural register files may be physically implemented within or near execution units 235-240. It is contemplated that in some embodiments, core 100 may include more or fewer than two integer execution units, and the execution units may or may not be symmetric in functionality. Also, in some embodiments execution units 235-240 may not be bound to specific issue slots, or may be differently bound than just described.

Floating point/graphics unit 255 may be configured to execute and provide results for certain floating-point and graphics-oriented instructions defined in the implemented ISA. For example, in one embodiment FGU 255 may implement single- and double-precision floating-point arithmetic instructions compliant with the IEEE 754-1985 floating-point standard.

Load store unit 245 may be configured to process data memory references, such as integer and floating-point load and store instructions and other types of memory reference instructions. LSU 245 may include a data cache 250 as well as logic configured to detect data cache misses and to responsively request data from L2 cache 105. In one embodiment, data cache 250 may be configured as a set-associative, write-through cache in which all stores are written to L2 cache 105 regardless of whether they hit in data cache 250. As noted above, the actual computation of addresses for load/store instructions may take place within one of the integer execution units, though in other embodiments, LSU 245 may implement dedicated address generation logic. In some embodiments, LSU 245 may implement an adaptive, history-dependent hardware prefetcher configured to predict and prefetch data that is likely to be used in the future, in order to increase the likelihood that such data will be resident in data cache 250 when it is needed.

In various embodiments, LSU 245 may implement a variety of structures configured to facilitate memory operations. For example, LSU 245 may implement a data TLB to cache virtual data address translations, as well as load and store buffers configured to store issued but not-yet-committed load and store instructions for the purposes of coherency snooping and dependency checking. LSU 245 may include a miss buffer configured to store outstanding loads and stores that cannot yet complete, for example due to cache misses. In one embodiment, LSU 245 may implement a store queue configured to store address and data information for stores that have committed, in order to facilitate load dependency checking. LSU 245 may also include hardware configured to support atomic load-store instructions, memory-related exception detection, and read and write access to special-purpose registers (e.g., control registers).

Regarding the pick queue in the pick unit 225, in order to maintain high performance, the selection of multiple decoded and renamed instructions to send to the issue unit 230 occurs in a single pipeline stage. As described above, a pick queue within the pick unit 225 may store a number of decoded and renamed instructions as well as information about the relative age and status of the stored instructions. During a single clock cycle Pick pipeline stage, instructions may be picked from a number of instructions stored in the pick queue within the pick unit 225. Picked instructions are sent to the issue unit 230.

Logic within the pick unit 225 may split the instruction pick operation into two tasks, wherein a first task is responsible for dataflow ordering, such as instruction dependencies. A subsequent second task is responsible for resource allocation and age tracking. A dependency cycle formed between logic to perform the first task which identifies ready instructions, and logic to perform the second task which selects a set of ready instructions for execution, forms a tight loop which is well known as critical to performance as described by E. Borch, et al. Loose loops sink chips, in Proceedings of HPCA-8, February 2002.

Typically, during the first task, which is responsible for dataflow ordering, an instruction is considered ready if it is not dependent on any other instructions in the pick queue. In order to determine an instruction stored in the pick queue is now able to obtain source operands from completed older (in program order) instructions, a broadcast of the results may be used to notify younger (in program order) dependent instructions. Generally, a broadcast observes results being generated and notifies waiting dependent instructions that are now ready for execution.

Figure 2:
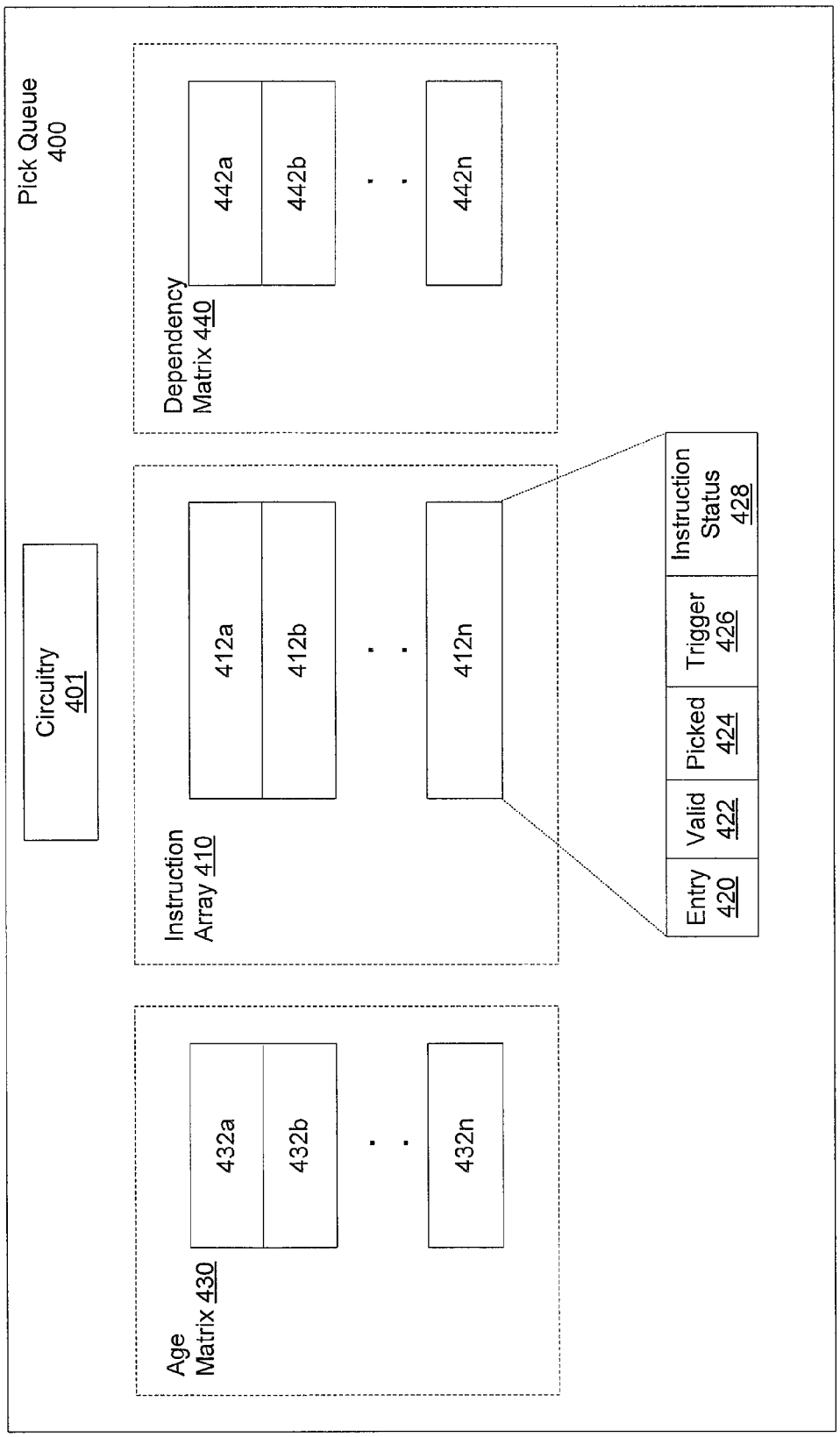
FIG. 2 is a generalized block diagram illustrating one embodiment of the entries of a pick queue.

Turning now to FIG. 2, one embodiment of a pick queue 400 configured to hold instructions that may be picked for execution is shown. In one embodiment, pick queue (PQ) 400 holds decoded (and possibly renamed) instructions in processor core 100. The buffered instructions may include micro-operations, or micro-ops, if core 100 is configured to support such operations. In one embodiment, the pick queue 400 includes an instruction array 410, age matrix 430, a dependency matrix 440, and circuitry 401 configured to control various aspects of the pick queue 400. Instruction array 410 may be used for maintaining status and characteristics of decoded and renamed instructions. Age matrix 430 may be used for hardware resource allocation and instruction age tracking. Dependency matrix 440 may be used for dataflow ordering.

A single entry of the pick queue 400 may comprise corresponding entries in each of the instruction array 410, age matrix 430, and dependency matrix 440. For example, a first entry in the pick queue 400 may comprise entries 432a, 412a, and 442a. A second entry in the store queue 400 may comprise entries 432b, 412b, and 442b, and so on. In general, the pick queue 400 may be responsible for scheduling multiple instructions each clock cycle for execution.

One task of an instruction pick operation regarding dataflow ordering utilizes the instruction array 410 and the dependency matrix 440. The instruction array 410 in FIG. 2 comprises a plurality of entries 412, wherein each entry 412 may correspond to a decoded and renamed instruction. As used herein, elements referred to by a reference numeral followed by a letter may be collectively referred to by the numeral alone. For example, entries 412a-412n may be collectively referred to as entries 412. In one embodiment, each entry 412 includes an entry number 420, a valid field 422, a picked field 424, a trigger field 426, and an instruction status field 428. Although the fields are shown in this particular order, other combinations are possible and other or additional fields may be utilized as well. The bits storing information for the fields 420-428 may or may not be contiguous. Similarly, the arrangement of instruction array 410, age matrix 430, and dependency matrix 440 array may use other placements for better design trade-offs.

In one embodiment, the entry number 420 corresponds to the position of an entry in the pick queue 400, wherein entry 0 may be configured to be at the top of instruction array 410 or at the bottom depending on logic preferences. The entry field 420 may be implied rather than an actual stored number. In one embodiment, pick queue entries may be dynamically allocated in a previous (e.g., renaming) pipe stage. The valid field 422 for a queue entry is updated with a value to indicate a valid entry when the entry is allocated. As will be discussed further, a pick queue entry may be deallocated upon instruction completion if, for example, no load/store hazards exist for the corresponding pick queue entry. The valid field 422 may be reset to a value indicating an empty entry when the entry is deallocated.

Picked field 424 may be used to indicate a corresponding instruction has been picked. Also, the picked field 424 may be used to ensure the corresponding instruction is not subsequently re-picked. Between a first clock cycle when a particular instruction is picked and a second clock cycle when the particular entry is deallocated, the particular instruction is not re-picked due to a set value in the picked field 424. In various embodiments, between the first and second clock cycles, the particular instruction may be disqualified as being ready during pipe stage Pick 304. The trigger field 426 may allow a younger dependent instruction to be picked prior to an older instruction that it depends on completing its operation. The status field 428 may contain additional information regarding the corresponding instruction.

The deallocation described above may allow younger dependent instructions to be picked and begin execution just-in-time to receive the corresponding generated result data of the multi-cycle FGU 255 instruction. In contrast, a multi-cycle load instruction is not deallocated from the pick queue 400 when it is picked. This load instruction may later miss in the data cache. Therefore, a multi-cycle load instruction utilizes the trigger field 426, and not deallocation from the pick queue 400, in order to allow younger dependent instructions to be picked and to begin execution just-in-time to receive the corresponding generated result data.

In one embodiment, the pick queue 400 supports the speculative pick and issue of certain instructions such as a load operation. For load instructions, the corresponding trigger bit 426 may be set a predetermined number of cycles after the load is picked. This predetermined number may be based on the assumption that the load instruction hits in the data cache. The setting of this trigger bit 426 may allow younger dependent instructions to be subsequently picked. If the load instruction misses in the data cache, all of the corresponding dependent instructions may replay, or be re-picked by the pick queue 400 for execution at a later time, such as when the load miss data is returned from the memory subsystem. Upon detecting a load miss, the corresponding picked 424 and trigger 426 bits of the load instruction may be set to {1,0}. The corresponding picked 424 and trigger 426 bits of the dependent instructions may be set to {0,0}. In this state, the dependent instructions may not be picked to issue and execute since the original load instruction is picked and not yet triggered. Once the load miss completes, the corresponding fields 424 and 426 of the load instruction may be set to {1,1} allowing the dependent instructions to be possibly picked.

For certain cases such as data translation look-aside buffer (d-TLB) misses, it may be desirable to replay the load or store instruction that caused the TLB miss as well as any dependent instructions. In this case, the corresponding bits 424 and 426 of the original load or store instruction may be set to {0,0} upon completion of the d-TLB miss.

Returning to FIG. 2, the status field 428 may contain additional information regarding the corresponding instruction. One example is a stalled bit that when asserted prevents the corresponding entry from being picked. This stalled bit may be used to remove instructions from instruction pick consideration while allowing other instructions stored in the pick queue 400 to be considered for instruction pick for a given hardware resource.

Another example of information stored in the instruction status field 428 may be a single bit that is asserted when it is known the corresponding instruction is an instruction type that produces results in a single cycle. For example, it may be known that an integer arithmetic instruction is able to produce a result in a single execution clock cycle.

A third example of a sub-field within the instruction status field 428 may be an enable bit that enables the use of the trigger bit. This enabled bit may be used to avoid forwarding of results from a cryptographic operation. A resource tag corresponding to the instruction stored in the entry may be also held in the instruction status field 428.

In one embodiment, pick queue 400 may be implemented as a unified queue. As stated earlier, a processor core 100 comprising a pick queue 400 may be configured to perform dynamic multithreading. It may not be desirable to instantiate on-chip a separate pick queue 400 for each thread due to on-chip real estate constraints. Also, a single pick queue 400 divided evenly among the maximum number of supported threads, wherein the subdivisions incorporate static allocation, may be inefficient.

For example, if processor core 100 is configured to concurrently execute 8 threads and pick queue 400 has 40 total entries (or 40 entries 412, 40 entries 432, and 40 entries 442), then, in one embodiment, 5 pick queue entries support each thread. Alternatively, a separate 5-entry pick queue may exist for each thread. However, each of the 5 entries in these examples for a particular thread may not be fully utilized or may not be utilized at all, as the particular thread may not be scheduled with work. Another thread, on the other hand, may be utilizing all 5 of its pick queue entries and may need more in order to not experience stalls. Therefore, it may be more efficient and provide higher performance to use dynamic allocation of a unified pick queue 400. In one embodiment, a design tradeoff with dynamic allocation of pick queue entries is the entries do not provide an indication of an ordering among the instructions.

The purpose of maintaining dataflow ordering among the instructions stored in the pick queue 400 is to observe when results are generated and identify instructions that are ready for execution. In one embodiment, content addressable memories (CAMs) may be used within the pick queue to maintain dataflow ordering. The result tags, which may simply be a physical register number, of older (in the pipeline) instructions that have completed execution are broadcasted on a set of result buses, one for each functional unit with a writeback port. Each set of result buses may be connected to comparators, such as xnor gates, at each entry within the pick queue. These comparators allow instructions to determine if their sources match the results being generated. When all of an instruction's sources are ready, the instruction as a whole is considered ready. However, CAMs consume an appreciable amount of both on-chip real estate and electrical power.

In another embodiment, rather than use CAMs to broadcast results, a dependency matrix 440 such as that shown in FIG. 2 may be used. A dependency matrix 440 has one row and one column for every instruction in the pick queue 400. Each cell may hold one bit of state representing whether an instruction assigned to a particular row, or entry 442, is waiting on a dependency from an instruction assigned to a particular column. The bit vectors stored in rows 442 may be set via allocation comparators, which may place a logical high value in the row if the corresponding column produces a corresponding result tag. In one embodiment, as older (in the pipeline) instructions are deallocated from the pick queue 400, a corresponding column is cleared (i.e., set all bits in the column to a logic low value).

The deallocation of speculative instructions, such as load and store instructions, and dependent instructions of the speculative instructions may be handled differently from other instructions. For example, each store operation within processor core 100 may be considered to be a speculative operation in the sense that a miss to a data translation look-aside buffer (d-TLB) may arise during execution of the store instruction by the LSU 245. Similarly, each load operation within processor core 100 may be considered to be a speculative operation in the sense that a miss to the d-TLB, a miss to the data cache, or a read-after-write (RAW) data hazard may arise during execution of the instruction by the LSU 245. When a miss or hazard arises during execution of a load or a store instruction, the pick unit 225 may support various levels of replay capability for dependent instructions after the load instruction. The pick unit 225 may undo a predetermined number of instruction pick clock cycles and subsequently replay the dependent instructions. In one embodiment, independent instructions may not be replayed.

Due to load and store instruction speculation, corresponding entries 442 may not be immediately deallocated in the pick queue 400 once an instruction is picked. The picked bit 424 is used to ensure that the corresponding entry 442 is not re-picked between the cycle an instruction is picked and the cycle an instruction is deallocated from the pick queue 400. Younger dependent instructions in the pick queue 400 may not be picked unless the trigger bit 426 of the corresponding older (in program order) instruction is set.

Once a pool of instructions is determined to be ready for an instruction pick, the next step is to pick instructions from this pool based on hardware resource groupings, or slots. A slot may correspond to one or more functional units such as a load/store unit (LSU) 245, an integer execution unit 235 or 240, a branch unit, cryptographic unit, a floating-point unit 255, or other. Each instruction may be assigned by decode unit 215 to a slot prior to being written into the pick queue 400.

In one embodiment, a slot 0 assignment may correspond to both memory reference address resolutions and integer arithmetic or logical instructions. A slot 1 assignment may correspond to integer arithmetic or logical instructions, branch instructions, floating-point instructions, cryptographic instructions, and integer instructions executed by the floating-point graphics unit (FGU), such as integer multiply and divide instructions. A slot 2 assignment may correspond to store data acquisition operations. Other assignments and number of slots are possible and contemplated. Instruction picking within a slot may be independent of instruction picking within other slots. In order to be picked, an instruction must be the oldest ready instruction for a particular slot.

Each entry in the pick queue 400 has an age vector 432. The age vector 432 may be generated for each instruction during a renaming clock cycle before the instruction is written into the pick queue 400. The age vector 432 may be a bit vector that represents all instructions currently in the pick queue 400 that are older than the instruction being written on a slot basis.

A bit vector block with N bits may be generated to ensure that the oldest ready instruction for each slot is picked each cycle. Each bit of this block vector may represent an entry in the pick queue 400. Each bit of this block vector may be constructed from a logical AND-OR reduction of a corresponding ready vector, which is made up of the values of Ready for each entry, with the corresponding age vector for the entry. In one embodiment, a final pick bit for each entry of the pick queue 400 may be a combination in a logical AND operation of a corresponding Ready value and an inverted corresponding block value. In another embodiment, the valid field 422 may be additionally combined if it hasn't already been combined.

As stated earlier, significant losses in throughput performance can occur when a thread hog monopolizes entries within a resource such as the pick queue 400. Again, a thread hog results when a thread accumulates a disproportionate share of a dynamic resource and the thread is slow to deallocate the resource. For certain workloads, thread hogs can cause dramatic throughput losses for not only the hog, but also for all other threads sharing the same resource. A thread hog may effectively block other threads from being executed. For example, load instructions may be implemented as speculative instructions within the pick queue 400. A particular load instruction and its dependent instructions (both direct and indirect) may remain stored in the pick queue 400 for potential replay until the hit/miss status of the load instruction is resolved. A cache line fill transaction for a load miss may take several clock cycles to complete. During this time, entries in the pick queue 400 are occupied by instructions of a particular thread that may have already been picked and issued. Now fewer entries within the pick queue 400 are available for use by other threads. Accordingly, the pick queue 400 may comprise logic for efficient thread arbitration.

Figure 3:
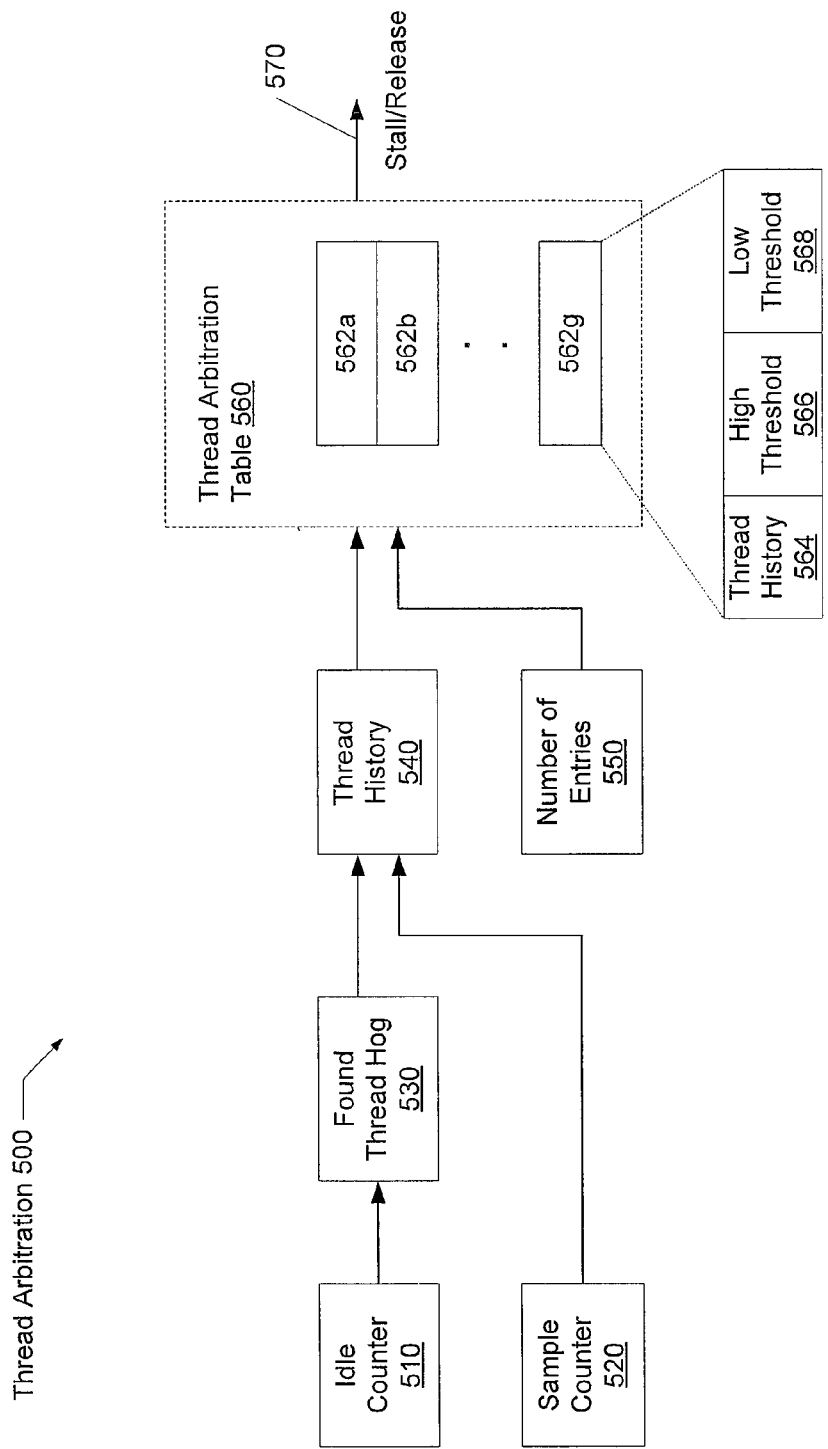
FIG. 3 illustrates one embodiment of a thread arbitration system.

Referring now to FIG. 3, one embodiment of a thread arbitration system 500 is shown. In one embodiment, a separate thread arbitration system 500 may be used for each of several resources that may be shared between threads. Examples of such resources may include queues utilized in a fetch pipe stage, a load and store memory pipe stage, rename and issue pipe stages, a completion pipe stage, branch prediction schemes, and memory management control. For illustrative purposes, the pick queue 400 is used as a chosen resource for the description of the thread arbitration system 500. However, any resource may be chosen. Additionally, in one embodiment, a separate thread arbitration system 500 may be used for each thread which uses a resource such as the pick queue 400.

In one embodiment, an idle counter 510 may be incremented each clock cycle that one or more entries of the pick queue 400 are allocated to a corresponding thread. The idle counter 510 may be reset to zero when the thread deallocates any corresponding entries of the pick queue 400. When the idle counter 510 reaches a predetermined value, such as 16, the corresponding thread may be considered to be a thread hog. As one example, software simulations may be used to find this predetermined value. When the idle counter 510 reaches this predetermined value, a found thread hog register 530 may be set and the idle counter 510 may be reset. When the found thread hog register 530 is set, it may indicate the corresponding thread has been identified as a thread hog.

A sample counter 520 may also be incremented each clock cycle that one or more entries of the pick queue 400 are allocated to the corresponding thread. When the sample counter 520 reaches a predetermined value, such as 32, a sample is taken of the current thread hog state of the thread. The value stored in the found thread hog register 530 may be shifted into the thread history shift register 540. In one embodiment, the thread history register is a 4-bit register. The thread history shift register 540 may reflect the last 4 samples of the found thread hog register 530 for a given thread with bit 0 being the youngest sample and bit 3 being the oldest sample. The sample counter 520 may be reset at the time of a sample when it reaches the predetermined value. In addition, the found hog register 530 may be reset after its stored value is shifted into the thread history shift register 540 at the time of a sample.

A number of entries counter 550 may increment each clock cycle by a net amount equal to the net number of entries allocated in the pick queue 400 in the clock cycle. One or more entries may be allocated for the corresponding thread in a clock cycle. In addition, one or more entries may be deallocated for the corresponding thread in a clock cycle. The net difference between the number of entries allocated and deallocated for the corresponding thread may be used to update the number of entries register 550.

A flush of the out-of-order pipeline for the corresponding thread may occur due to a variety of conditions such as a branch misprediction, a trap, or other. During such a pipeline flush, in one embodiment, the idle counter 510, the sample counter 520, the found thread hog register 530, the thread history shift register 540, and the number of entries register 550 may each be reset. In another embodiment, a logic zero value may be shifted into the thread history shift register 540 in order that recent history information may still be used after the pipeline flush.

The thread history shift register 540, in one embodiment, may be used to index a thread arbitration table 560. The thread arbitration table 560 may comprise a plurality of entries 562. In one embodiment, each entry 562 may include a thread history field 564, a high threshold field 566, and a low threshold field 568. A particular entry 562 may be chosen based upon the stored value in the thread history shift register 540. The particular entry 562 may have a same value stored in its thread history field 564 as the value stored in the thread history shift register 540.

In another embodiment, another register may be updated each clock cycle with a number of active threads in the processor. Then both the thread history shift register 540 and the value of the number of active threads may be used to index the thread arbitration table 560. In this embodiment, a particular entry 562 may be chosen based upon the stored value in the thread history shift register 540 and the stored value of the number of active threads. The particular chosen entry 562 may have a same value stored in its thread history field 564 as the value stored in the thread history shift register 540. In addition, each entry 562 may have an additional field for storing a number of active threads. The particular chosen entry 562 may have a same value stored in this additional field as the value stored in the additional register holding the number of active threads in the processor. In yet another embodiment, multiple thread arbitration tables 560 may be utilized, wherein a particular thread arbitration table may be selected by the value stored in the additional register holding the number of active threads. A particular entry 562 within this chosen thread arbitration table 560 may be selected by the value stored in the thread history shift register 540.

The values stored in each of the high threshold field 566 and low threshold field 568 may be compared to the value stored in the number of entries register 550. The values stored in the fields 566 and 568 may be used in a high-watermark/low-watermark scheme in order to stall or release the corresponding thread in a select pipe stage. If the value stored in the number of entries register 550 equals or exceeds the value stored in the high threshold field 566, then the corresponding thread has more entries in the pick queue 400 allocated than the current high-watermark. Accordingly, a stall occurs for the corresponding thread in the select pipe stage. The stall/release signal 570 conveys the appropriate value of a stall for this thread. It is noted that when there is only one active thread in the processor, there is no contention for resources. Therefore, with only a single active thread in the processor, a stall may not occur for the thread due to exceeding the current high-watermark value.

Here, it is noted, the term stall has been used multiple times in this description. The context in which the term stall is used may provide the desired meaning of the term. First, the term stall is used to describe pipeline stalls, which are known to those skilled in the art. Second, the term stall is used to describe the prevention of picking an entry of the pick queue 400 for subsequent issue and execution pipe stages. This stalled bit may be used to remove instructions from instruction pick consideration while allowing other instructions stored in the pick queue 400 to be considered for instruction pick. Third, the term stall may be used to describe the prevention of allocating an entry in the pick queue 400 by a thread determined to be a thread hog.

Stalling this thread in the select pipe stage may reduce the ability of this thread to monopolize entries in the pick queue 400. The stalling of the selection of this thread may increase the selection of entries allocated by other threads that are determined to not be thread hogs. The assertion of the corresponding stall signal 570 to stall this thread may remain in effect until this thread deallocates a predetermined number of entries of the pick queue 400 in order to satisfy a low-watermark threshold. This low-watermark threshold value may be stored in the low threshold field 568. Alternatively, the pipeline flush described above may also release the stall of this thread since all entries of the pick queue 400 corresponding to this thread are released upon a pipeline flush.

If the value stored in the number of entries register 550 equals or is less than the value stored in the low threshold field 568, then the corresponding thread has less entries in the pick queue 400 allocated than the current low-watermark. Accordingly, a release occurs for the corresponding thread in the select pipe stage. The stall/release signal 570 conveys the appropriate value of a release for this thread. Entries of the pick queue 400 may be allocated for this thread in the select pipe stage. The assertion of the corresponding release signal 570 to release this thread may remain in effect until this thread allocates a predetermined number of entries of the pick queue 400 in order to satisfy the high-watermark threshold.

Tuning now to FIG. 4A, another embodiment of a thread arbitration table 600 is shown. In one embodiment, the thread history shift register 540 may comprise 4 bits. The value stored in register 540 may be compared to the 4-bit values stored in the thread history [3:0] column of the thread arbitration table 600. An entry with a thread history value matching the value stored in the thread history shift register 540 may have the corresponding values stored in the high threshold and low threshold columns read out. Then these values may be compared to the value stored in the number of entries register 550.

For example, if the thread history shift register 540 stores a Boolean value '0110' in a particular pipe stage, then the corresponding high and low threshold values 12 and 6 are read out. These values are compared to the value stored in the number of entries register 550. If the value stored in register 550 is 12 or higher, then the corresponding thread is stalled and no entries of the pick queue 400 are allocated for this thread in the select pipe stage. The corresponding thread may or may not have been in a stalled state already from a previous select pipe stage.

If the value stored in register 550 is between 12 and 6, then the previous stalled or release state of the thread is maintained. If the value stored in register 550 is 6 or lower, then the thread is released and entries of the pick queue 400 may be allocated for this thread in the select pipe stage. The corresponding thread may or may not have been in a release state already from a previous select pipe stage.

It may be discovered that a single set of values for high- and low-watermark pairs may not provide optimal performance for all combinations of computer programs. Therefore, a single thread arbitration table 600 of high- and low-watermark values may not provide optimal performance across all numbers of active threads. Significant performance gains may be realized by using alternate values in a thread arbitration table 600 for lower values of active threads.

Tuning now to FIG. 4B, another embodiment of a thread arbitration table 650 is shown. The columns for thread history [3:0], high-threshold (HT), and low-threshold (LT) values are similar to the columns found in table 600 of FIG. 4A, though actual stored values may differ. Table 650 has additional information such as different ranges for high- and low-threshold values depending on a number of active threads (AT) in the processor. In the example shown, each row includes three sets of AT, HT, and LT values. Table 650 may be physically implemented in a number of ways known by those skilled in the art. In one embodiment, a 4-bit thread history shift register 540 may be used to index table 650 and select a given row. In addition, a number of active threads in the processor may be used to select one of the three sets of values in the given row. The number of active threads may be represented by a value stored in a register or other location as desired. For example, if the thread history shift register 540 currently stores a binary value 0001, then the second row of table 650 is selected. Also, if there are 7 threads currently active in the processor, then the AT value falls within the range 5 to 8 and the first set of AT, HT, LT values may be selected. Accordingly, the third and fourth columns may be read to correspond to a high-threshold value of 16 entries and a low-threshold value of 8 entries. These values may then be compared to the value stored in the number of entries register 550 which indicates a number of entries currently allocated by the given thread.

In another example, if the thread history shift register 540 current stores a binary value 1000, then the ninth row of table 650 is chosen. If there are 4 active threads currently in the processor, then a match with the fifth column may be found. Accordingly, the sixth and seventh columns may be read corresponding to a high-threshold value of 24 entries and a low-threshold value of 16 entries. Then these values may be compared to the value stored in the number of entries register 550. If a few clock cycles later the number of active threads in the processor drops from 4 active threads to 3 active threads, and no update has yet occurred regarding the thread history shift register 540, then during the next index of table 650, the same ninth row corresponding to the binary value 1000 may again be chosen. However, now the final two columns are selected, since the 3 active threads correspond to the range of 2 to 3 active threads stored in the eight column. Accordingly, the high- and low-threshold values of 32 and 24 are read out and compared to the value stored in the number of entries register 550.

As mentioned earlier, table 650 may be physically implemented in a number of ways known by those skilled in the art. For example, a separate table may be utilized for each range of active threads. A first table may hold values of thread history, high-threshold, and low-threshold for a range of 5 to 8 active threads. A second table may hold corresponding values for a number of 4 active threads. A third table may hold corresponding values for a range of 2 to 3 active threads. The selection of one of these three tables may be performed by control logic configured to read a register holding a current count of the number of active threads in the processor and determining the corresponding range and table via comparison logic. Alternatively, the combination of the thread history and number of active threads may be used to index a single table. In yet other examples, longer or shorter histories may be recorded in the thread history shift register 540. Also, smaller or larger ranges of the number of active threads may be chosen to characterize the high- and low-threshold values.

Figure 5:
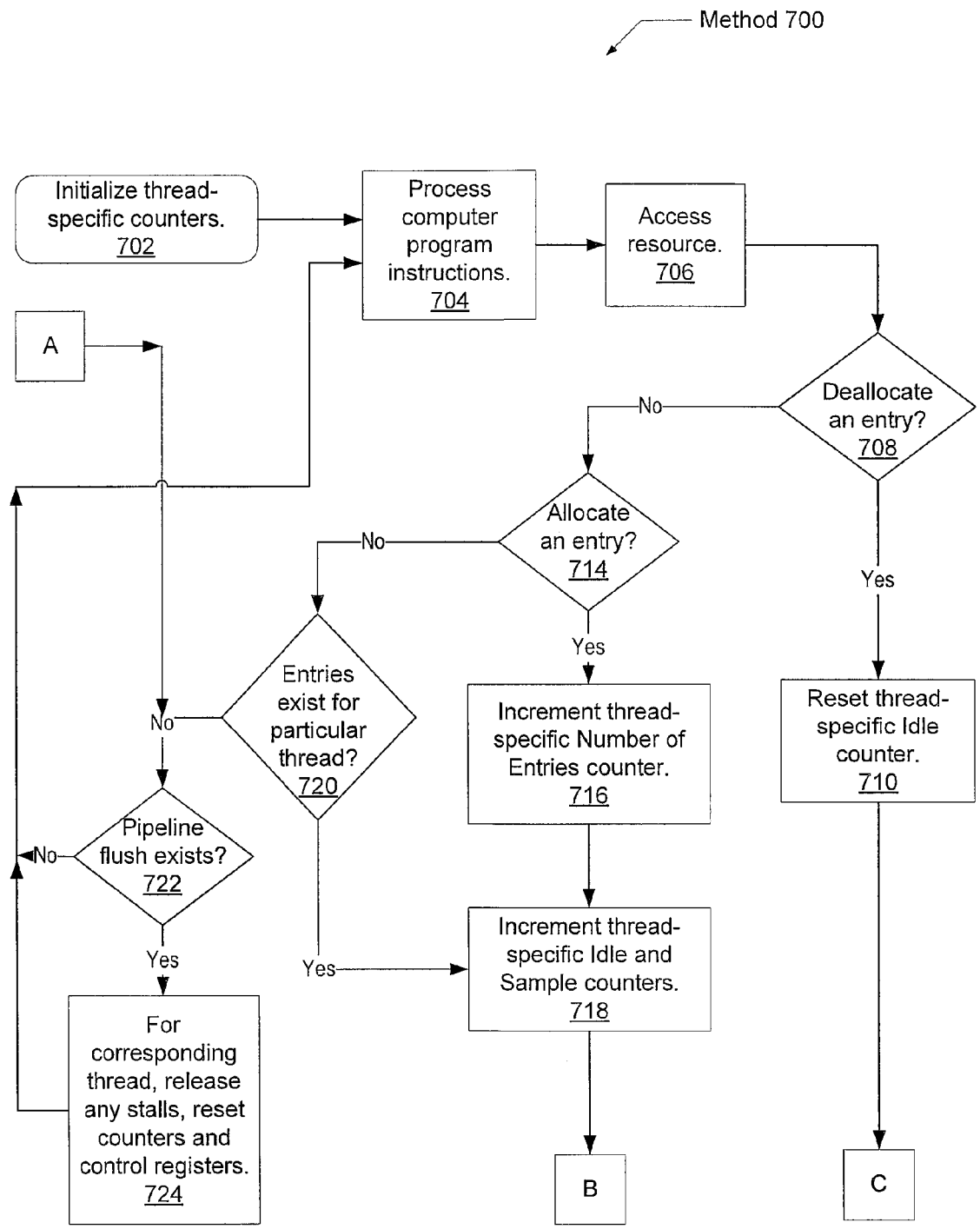
FIG. 5 is a generalized flow diagram illustrating one embodiment of a method for efficient thread arbitration in a processor.

Referring now to FIG. 5, one embodiment of a method 700 for efficient thread arbitration in a processor is shown. The components embodied in the processor core 100 and pick queue 400 described above may generally operate in accordance with method 700. For purposes of discussion, the steps in this embodiment are shown in sequential order. However, some steps may occur in a different order than shown, some steps may be performed concurrently, some steps may be combined with other steps, and some steps may be absent in another embodiment.

A processor core 100 may initialize thread-specific counters in block 702. These counters may include the idle counter 510 and the sample counter 520. In addition, the found thread hog register 530, the thread history shift register 540, and the number of entries register 550 may be reset or initialized. In block 704, the processor core 100 may be executing instructions of one or more software applications. These instructions may correspond to one or more threads.

During the processing of these instructions of multi-threaded applications, in block 706, the processor core 100 may access a resource such as pick queue 400 in the select pipe stage. In an earlier rename pipe stage, the processor core 100 may have determined whether a particular thread is a thread hog and whether to stall the particular thread from allocating more entries of a resource such as pick queue 400. The steps for these determinations are further described below. However, first, the steps involved in the subsequent select pipe stage are provided here. In one embodiment, in block 706, the pick queue 400 is accessed in the select pipe stage. For a particular thread, if one or more entries of the pick queue 400 are deallocated (conditional block 708), then in block 710, the corresponding idle counter 510 is reset. Then control flow of method 700 moves to block C.

If no entries of the pick queue 400 are deallocated (conditional block 708), but one or more entries are allocated (conditional block 714), then in block 716, the number of entries register 550 may be updated. In one embodiment, the number of entries register 550 may be incremented by a value equal to the number of entries allocated in the pick queue 400 in the select pipe stage. In block 718, each of the idle register 510 and sample register may be incremented by one. Then control flow of method 700 moves to block B.

If no entries are allocated for the corresponding thread (conditional block 714), but one or more entries are still allocated for the thread from a previous clock cycle in the pick queue 400 (conditional block 720), then control flow of method 700 moves to block 718. If no entries in the pick queue 400 are currently used by the corresponding thread (conditional block 720), then control flow of method 700 returns to block 704 if no pipeline flush exists for the corresponding thread (conditional block 722). Otherwise, if a pipeline flush does exist for the corresponding thread (conditional block 722), then in block 724, counters and control registers are reset. If a stall signal 570 is asserted for the thread, this signal is deasserted and the thread is released for selection in a subsequent select pipe stage. Both the idle counter 510 and sample counter 520 may be reset to zero. The control registers such as the found thread hog register 530, thread history shift register 540, and number of entries register 550 may be reset to zero. Alternatively, a logic zero value may be shifted into the thread history shift register 540 so that recent history information may still be used after the pipeline flush. Then control flow of method 700 returns to block 704.

Figure 6:
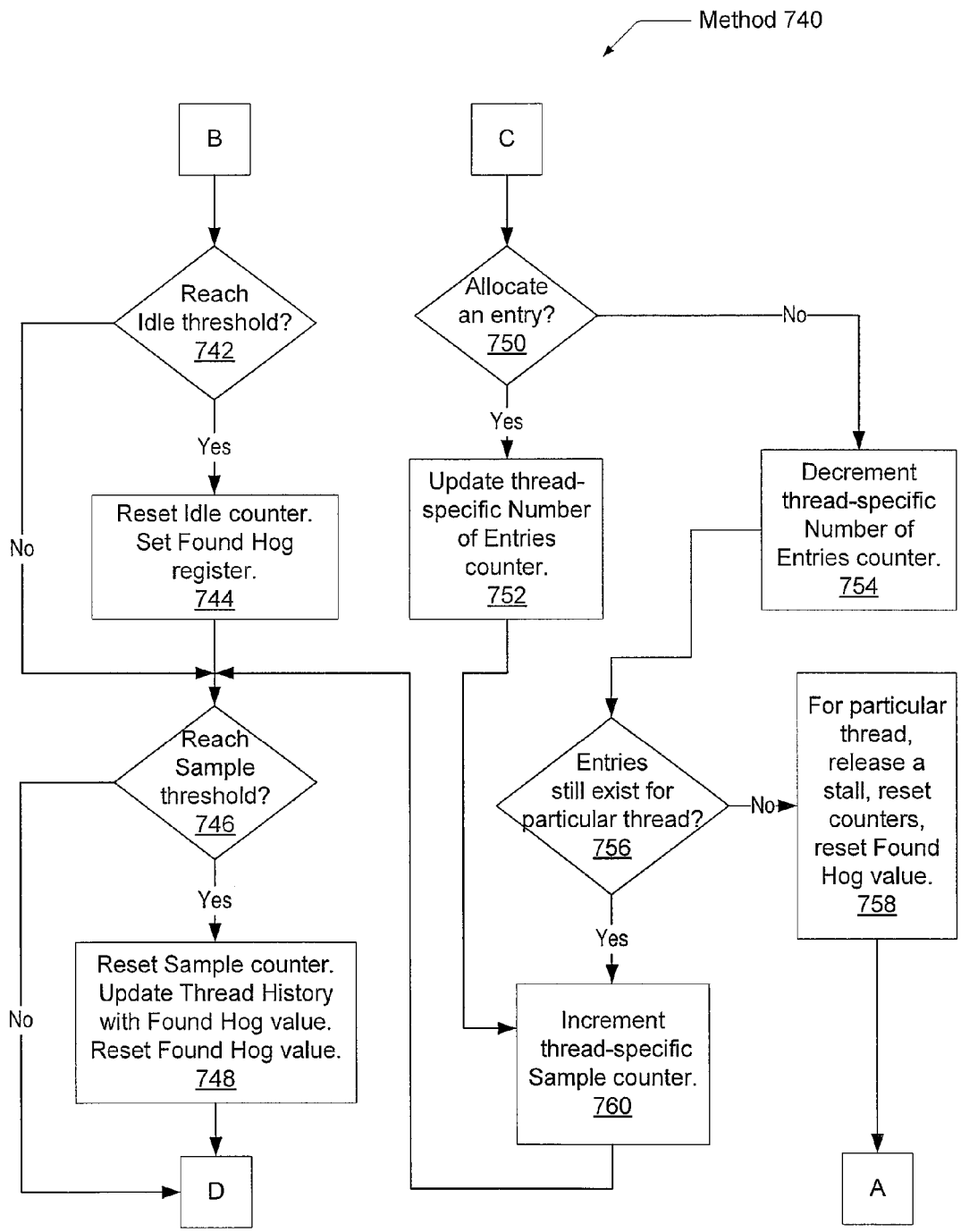
FIG. 6 is a generalized flow diagram illustrating one embodiment of a method for efficient thread arbitration in a processor.

Referring now to FIG. 6, one embodiment of a method 740 for efficient thread arbitration in a processor is shown. As with method 700, the steps in this embodiment are shown in sequential order. However, some steps may occur in a different order than shown, some steps may be performed concurrently, some steps may be combined with other steps, and some steps may be absent in another embodiment.

Block B is reached from method 700 after one or more entries of a resource, such as the pick queue 400, are allocated for the corresponding thread. Control flow of method 740 moves from block B to conditional block 742. If the idle counter 510 reaches a value equal to a predetermined idle threshold (conditional block 742), then in block 744, both the idle counter 510 is reset and the found thread hog register 530 is set. The corresponding thread has occupied entries in the pick queue 400 for a predetermined length of time without deallocating any entries. Perhaps a load miss to the data cache has occurred and the thread is waiting for a cache fill transaction to complete. In the meantime, the thread has become a thread hog within the pick queue 400. Therefore, the corresponding found thread hog register 530 is set. Otherwise, control flow of method 740 moves directly to conditional block 746.

If the sample counter 520 reaches a value equal to a predetermined sample threshold (conditional block 746), then in block 748, the thread history shift register 540 is updated with the value stored in the found thread hog register 530. Then both the sample counter and the found thread hog registers are reset. Otherwise, control flow of method 740 moves to block D.

Block C is reached from method 700 after one or more entries of a resource, such as the pick queue 400, are deallocated for the corresponding thread. Control flow of method 740 moves from block C to conditional block 750. If one or more entries are allocated in the pick queue 400 for the corresponding thread in the same select pipe stage as one or more entries are deallocated (conditional block 750), then in block 752, the number of entries register 550 is updated. In block 752, the number of entries register 550 may have its stored value updated once after the net change in the number of entries is determined for the select pipe stage. For example, four entries may be allocated for the corresponding thread, but also, two other separate entries may be deallocated in the same pipe stage for the corresponding thread. Therefore, the net change for the select pipe stage is two entries allocated for the corresponding thread. The number of entries register 550 may be updated accordingly.

In block 760, the sample counter 520 is incremented since entries still exist for the corresponding thread in the pick queue 400. Then control flow of method 740 moves to conditional block 746. If no entries are allocated in the pick queue 400 for the thread in the same select pipe stage as one or more entries are deallocated (conditional block 750), then in block 754, the number of entries register 50 is updated. The number of entries register 550 may be decremented by a value equal to the number of entries deallocated from the pick queue 400. If one or more entries still exist for the thread in the pick queue 400 (conditional block 756), then control flow of method 740 moves to block 760. Otherwise, in block 758, counters and control registers are reset. If a stall signal 570 is asserted for the thread, this signal is deasserted and the thread is released for selection in a subsequent select pipe stage. Both the idle counter 510 and sample counter 520 may be reset to zero. The control registers found thread hog register 530, thread history shift register 540, and number of entries register 550 may be reset to zero. Then control flow of method 740 moves to block A.

Figure 7:
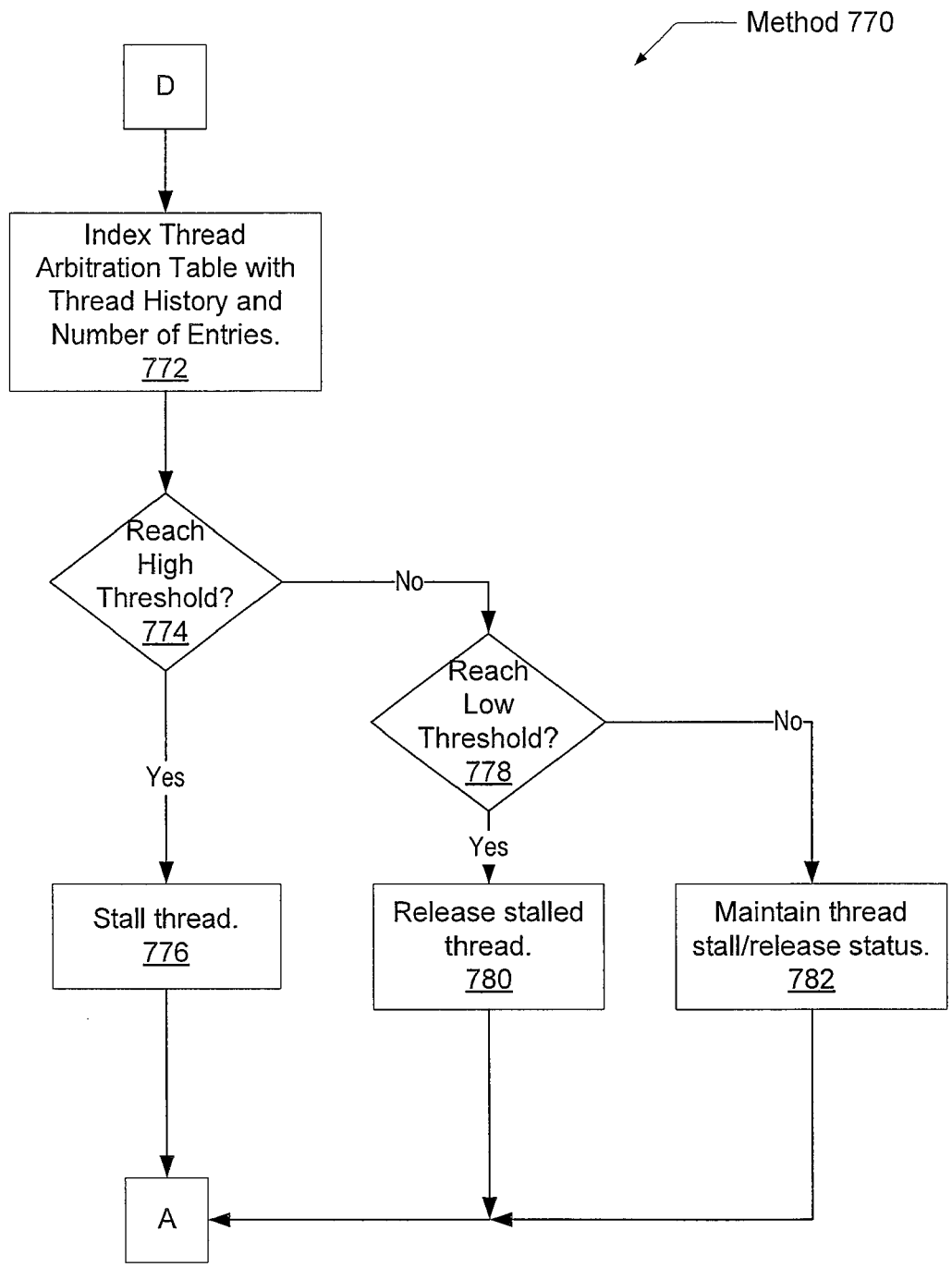
FIG. 7 is a generalized flow diagram illustrating one embodiment of a method for efficient thread arbitration in a processor.

Referring now to FIG. 7, one embodiment of a method 770 for efficient thread arbitration in a processor is shown. As with method 700, the steps in this embodiment are shown in sequential order. However, some steps may occur in a different order than shown, some steps may be performed concurrently, some steps may be combined with other steps, and some steps may be absent in another embodiment.

Block D is reached from method 740 after it is determined one or more entries still exist in a resource, such as the pick queue 400, for the corresponding thread. In block 772, in one embodiment, the thread history shift register 540 is used to index the thread arbitration table 560. In another embodiment, both the thread history shift register 540 and a number of active threads in the processor may be used to index the thread arbitration table 560. The value stored in the number of entries register 550 is conveyed to the thread arbitration table 560 for comparison matching. As described earlier regarding the thread arbitration table 560 in FIG. 3, the values stored in the fields 566 and 568 may be used in a high-watermark/low-watermark scheme in order to stall or release the corresponding thread in a select pipe stage.

In one embodiment, block 748 of method 740 and block 772 of method 770 may occur within a same pipe stage, such as a pick queue select pipe stage. In another embodiment, blocks 748 and 772 may be separated by multiple pipe stages due to a deep pipeline. In such an embodiment, for a given thread, a number of clock cycles may elapse between a time of an update of the thread history shift register 540 and an indexing of the thread arbitration table 560 and the following assertion of a resulting stall signal. This asserted stall signal may prevent instructions of the given thread from being considered for instruction pick for issue and execution. However, due to the delay of a potential stall, several additional instructions of the given thread may be selected, renamed, assigned hardware resource tags, and allocated in the pick queue before the given thread is actually stalled.

In some cases, the above described scenario may not greatly affect processor performance. However, for a given thread that is a severe thread hog, which is to be described shortly, waiting to stall the given thread may allow a significant portion of processor resources to be unnecessarily consumed. For example, during the delay, a number of pick queue entries may be allocated and a number of hardware resource tags may be assigned to the given thread, which could be utilized by other threads that are not severe thread hogs. One solution may be to provide a separate stall signal that may be asserted in the same or next pipe stage when the thread history shift register 540 is updated.

A severe thread hog, or a "true" thread hog, may be defined as a thread that has been consistently identified as a thread hog for a predetermined amount of time. For example, in one embodiment, when the corresponding 4-bit thread history shift register 540 holds the binary value "1111", the thread may be considered to be a true thread hog. Accordingly, a separate stall signal may be asserted for this thread in order to immediately react and halt consumption of processor resources for this thread. In another embodiment, when a true thread hog is identified, the thread arbitration table 560 may be accessed. If the number of entries counter 550 has a value less than or equal to the indexed low threshold value, then (in one embodiment) exactly one additional group of instructions of the given thread may be allowed to propagate down the pipeline rather than be stalled. For a true thread hog as defined, the allocation of even a single group of instructions may cause the stall signal (e.g., signal 570 shown in FIG. 3) to be asserted. For a true thread hog, allocation of a single group of instructions may satisfy the high watermarks of 2 as shown in FIG. 4B. Hence, a true thread hog may have only one group of instructions allocated in the machine at a time. A stall in this case ensures both that the intended high watermarks on true thread hogs are not exceeded and that resources are available to other threads that are not true thread hogs. In this manner, overall processor performance may be improved.

Returning to FIG. 7, if the value stored in the number of entries register 550 equals or exceeds the value stored in the high threshold field 566 (conditional block 774), then the corresponding thread has more entries in the pick queue 400 allocated than the current high-watermark. Accordingly, in block 776, a stall occurs for the corresponding thread in the select pipe stage. The stall/release signal 570 conveys the appropriate value for a stall of this thread. Then control flow of method 770 moves to block A.

If the high threshold is not reached (conditional block 774), but the value stored in the number of entries register 550 equals or is less than the value stored in the low threshold field 568, then the low threshold condition is reached (conditional block 778). Accordingly, in block 780, a release occurs for the corresponding thread in the select pipe stage. The stall/release signal 570 conveys the appropriate value of a release for this thread. Otherwise, if the low threshold is not reached (conditional block 778), then in block 782, the current stall/release state of the corresponding thread is maintained. Control flow of method 770 then moves to block A.

It is noted that other embodiments of methods 700 to 770 may index the thread arbitration table with a number of active threads in the processor in addition to the value stored in the thread It is noted that the above-described embodiments may comprise software. In such an embodiment, the program instructions that implement the methods and/or mechanisms may be conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A thread arbitration system for use in a processor, the system comprising:
   an array comprising a plurality of first entries each corresponding to an element of the array, wherein the array is shared by a plurality of threads, and wherein each entry of the plurality of first entries is configured for use by any thread of the plurality of threads;
   control circuitry, wherein in response to determining a given thread has not deallocated any entry of the plurality of first entries for a predetermined first amount of time, the circuitry is further configured to store an indication that the given thread has been identified as a thread hog;
   a thread arbitration table comprising a plurality of second entries, wherein each entry of the second entries is configured to indicate a high threshold value and a low threshold value; and
   a thread history shift register (HSR) corresponding to the given thread, wherein the thread HSR is used for indexing into the thread arbitration table to select a corresponding second entry, wherein each bit of the thread HSR indicates whether the given thread was identified as a thread hog over a previous predetermined second amount of time.

2. The system as recited in claim 1, wherein in response to determining a number of said plurality of first entries allocated by a given thread is greater than a corresponding high threshold value, the control circuitry is configured to indicate the given thread is stalled from allocating further entries of the first entries, and wherein in response to determining the given thread is stalled, the circuitry is further configured to wait until a number of first entries allocated by the given thread is less than a corresponding low threshold value before releasing the stall of the given thread.

3. The system as recited in claim 2, wherein the circuitry is further configured to indicate the given thread continues a current state of being stalled from allocating, or continues its current state of being permitted to allocate, entries of the first entries in response to determining a number of first entries allocated by the given thread is between the corresponding high threshold value and the corresponding low threshold value.

4. The system as recited in claim 1, further comprising a sample counter, wherein the sample counter is configured to increment each clock cycle that one or more entries of the plurality of first entries are allocated to the given thread, and wherein the circuitry is further configured to shift a thread hog indication value into the thread HSR responsive to detecting the sample counter has reached a predetermined value corresponding to the predetermined second amount of time.

5. The system as recited in claim 4, wherein the circuitry is further configured to:
   store an indication in a found thread hog register which indicates the given thread has been identified as a thread hog;
   responsive to determining one or more first entries are allocated by the given thread during the predetermined second amount of time:
   shift a value from the found thread hog register to the thread HSR; and
   reset the found thread hog register.

6. The system as recited in claim 4, wherein the circuitry is further configured to detect the predetermined first amount of time in response to an idle counter reaching a predetermined first count, wherein the idle counter increments each clock cycle that the given thread has entries of allocated first entries and resets responsive to the given thread deallocating an entry of the first entries.

7. The system as recited in claim 5, wherein the circuitry is further configured to select the second entry based at least in part on a number of active threads of the plurality of threads.

8. The system as recited in claim 1, wherein in response to determining each bit of the thread HSR indicates a given thread was a thread hog over each recent predetermined second amount of time, the given thread is identified as a true thread hog, and wherein in response to determining the given thread is a true thread hog, only one group of instructions of the given thread is allowed into a pipeline of the processor at a time.

9. A method for use in a processor, the method comprising:
   maintaining an array comprising a plurality of first entries each corresponding to an element of the array, wherein the array is shared by a plurality of threads, and wherein each entry of the plurality of first entries is configured for use by any thread of the plurality of threads;
   storing an indication in a found thread hog register which indicates a given thread has been identified as a thread hog in response to determining the given thread has not deallocated any entry of the plurality of first entries for a predetermined first amount of time;
   storing a high threshold value and a low threshold value in each entry of a thread arbitration table, wherein the thread arbitration table comprises a second plurality of entries;
   shifting a value of the found thread hog register into a corresponding thread history shift register (HSR) responsive to detecting a predetermined second amount of time has elapsed, wherein each bit of the thread HSR indicates whether the given thread was identified as a thread hog over a previous predetermined second amount of time; and
   indexing into the thread arbitration table and selecting a second entry with the corresponding thread.

10. The method as recited in claim 9, the method further comprising:
    indicating a given thread is stalled from allocating further entries of the first entries, in response to determining a number of said plurality of first entries allocated by the given thread is greater than a corresponding high threshold value; and
    in response to determining the given thread is stalled, waiting until a number of first entries allocated by the given thread is less than a corresponding low threshold value before releasing the stall of the given thread.

11. The method as recited in claim 10, wherein the method further comprises indicating the given thread continues its current state of being stalled from allocating, or continues its current state of being permitted to allocate, entries of the first entries in response to determining a number of first entries allocated by the given thread is between the corresponding high threshold value and the corresponding low threshold value.

12. The method as recited in claim 9, further comprising:
incrementing a sample counter each clock cycle that one or more entries of the plurality of first entries are allocated to a given thread; and
shifting a value from the found thread hog register into the thread HSR responsive to detecting the sample counter has reached a predetermined value corresponding to the predetermined second amount of time.

13. The method as recited in claim 12, wherein in response to determining one or more first entries are allocated by the given thread during the predetermined second amount of time, the method further comprises:
shifting a value from the found thread hog register into the thread HSR; and
resetting the found thread hog register.

14. The method as recited in claim 12, further comprising detecting the predetermined first amount of time, in response to an idle counter reaching a predetermined first count, wherein the idle counter increments each clock cycle that the given thread has entries of allocated first entries, and resets in response to the given thread deallocating an entry of the plurality of first entries.

15. The method as recited in claim 13, further comprising selecting the second entry based at least in part on a number of active threads of the plurality of threads.

16. The method as recited in claim 9, further comprising:
identifying a given thread as a true thread hog in response to determining each bit of the thread HSR indicates the given thread was a thread hog over each recent predetermined second amount of time;
allowing only a single group of instructions of the given thread into a pipeline of the processor, in response to determining the given thread is a true thread hog.

17. A non-transitory computer readable storage medium storing program instructions operable to efficiently arbitrate threads in a multi-threaded resource, wherein the program instructions are executable by a processor to:
maintain an array comprising a plurality of first entries each corresponding to an element of the array, wherein the array is shared by a plurality of threads, and wherein each entry of the plurality of first entries is configured for use by any thread of the plurality of threads;
store an indication in a found thread hog register which indicates a given thread has been identified as a thread hog in response to determining the given thread has not deallocated any entry of the plurality of first entries for a predetermined amount of time;
store a high threshold value and a low threshold value in each entry of a thread arbitration table, wherein the thread arbitration table comprises a second plurality of entries;
shift a value of the found thread hog register into a corresponding thread history shift register (HSR) responsive to detecting a predetermined second amount of time has elapsed, wherein each bit of the thread HSR indicates whether the given thread was identified as a thread hog over a previous predetermined second amount of time; and
index into the thread arbitration table and selecting a second entry with the corresponding thread.

18. The non-transitory storage medium as recited in claim 17, wherein the program instructions are further executable to:
indicate a given thread is stalled from allocating further entries of the first entries, in response to determining a number of said plurality of first entries allocated by the given thread is greater than a corresponding high threshold value; and
in response to determining the given thread is stalled, waiting until a number of first entries allocated by the given thread is less than a corresponding low threshold value before releasing the stall of the given thread.

* * * * *